(12) United States Patent
Gozewski et al.

(10) Patent No.: US 9,567,982 B1
(45) Date of Patent: Feb. 14, 2017

(54) ICE SHIELD FOR TOWER-MOUNTED EQUIPMENT

(71) Applicant: Laufer Wind Group LLC, New York, NY (US)

(72) Inventors: Paul F. Gozewski, Haverhill, MA (US); Rodney Alan Petr, Acton, MA (US); Eric David Laufer, New York, NY (US)

(73) Assignee: Laufer Wind Group LLC, New York, NY (US)

( * ) Notice: Subject to any disclaimer, the term of this patent is extended or adjusted under 35 U.S.C. 154(b) by 0 days.

(21) Appl. No.: 15/135,285

(22) Filed: Apr. 21, 2016

(51) Int. Cl.
  *E04D 13/10* (2006.01)
  *E04B 1/92* (2006.01)
  *E02B 17/00* (2006.01)

(52) U.S. Cl.
  CPC .......... *F03D 80/40* (2016.05); *E02B 17/0021* (2013.01); *E04B 1/92* (2013.01); *F03D 13/20* (2016.05)

(58) Field of Classification Search
  CPC .......... B60R 19/36; B60R 19/28; B60R 19/30; B60R 19/32; E04D 13/10
  USPC ........ 293/137, 131, 132, 135; 52/834, 24, 3, 52/97; 267/139, 140.11, 140.13; 343/704
  See application file for complete search history.

(56) References Cited

U.S. PATENT DOCUMENTS

| | | | |
|---|---|---|---|
| 2,783,066 A | 2/1957 | Field | |
| 4,126,864 A | 11/1978 | Hopkins | |
| 4,641,871 A * | 2/1987 | Vaughn | B60T 7/22 180/275 |
| 5,752,674 A | 5/1998 | Mears et al. | |
| 6,078,298 A | 6/2000 | Planning et al. | |
| 6,217,090 B1 * | 4/2001 | Berzinji | B60R 19/28 293/106 |
| D449,115 S | 10/2001 | Harris et al. | |
| 6,834,466 B2 * | 12/2004 | Trevorrow | E04D 13/10 248/512 |
| 7,029,044 B2 * | 4/2006 | Browne | B60R 19/03 267/175 |
| 7,201,429 B1 * | 4/2007 | Lange | B60R 19/52 280/770 |
| 7,650,716 B1 | 1/2010 | Schemeley | |

(Continued)

OTHER PUBLICATIONS

"Talley: MD-S12 MTS Wireless—12 Ft Microwave Antenna Ice Shield, Mount to 4-1/2' OD Pipe", 2 pages [retrieved on Jan. 27, 2016]. Retrieved from the Internet <URL: http://www.talleycom.com/viewProduct?HProdNum=MTSMD-S12>.

(Continued)

*Primary Examiner* — Rodney Mintz
*Assistant Examiner* — Daniel Kenny
(74) *Attorney, Agent, or Firm* — Proskauer Rose LLP (57) ABSTRACT

Described are ice shields and methods for protecting tower-mounted equipment. An ice shield assembly can include an ice shield. The ice shield can include a base, a blade structure attached to the base, at least one support member on each side of the blade structure attached on a first end to the blade structure and on a second end to the base, and a beam attached to at least one of the base, the blade structure, and the support members. The ice shield assembly can include a mounting bracket engaged with the beam that can permit vertical translation of the ice shield with respect to the mounting bracket. The ice shield can include a shock absorber configured to arrest relative motion between the ice shield and the mounting bracket by dissipating kinetic energy in the ice shield assembly.

20 Claims, 10 Drawing Sheets

(56) References Cited

U.S. PATENT DOCUMENTS

2010/0192479 A1* 8/2010 Elliott .................. E04D 13/106
52/24
2010/0237143 A1 9/2010 LaBrecque, Jr.

OTHER PUBLICATIONS

"Electronics Research, Inc.: Invisi-Shield™ Electrically Transparent Ice-Shield," 1 page, [retrieved on Jan. 27, 2016]. Retrieved from the Internet <URL: http://www.eriinc.com/catalog/towers/components-and-accessories/invisi-shield.aspx>.
"Kenwood Telecom Corp.: Ice Shields," 2 pages, [retrieved on Jan. 27, 2016]. Retrieved from the Internet <URL: http://www.kenwoodtelecom.com/prodcat/ice-shields.asp>.
"Commscope: Steel Products—Microwave Antenna Application Guide—Structural Support Products," 52 pages, [retrieved on Jan. 27, 2016]. Retrieved from the Internet <URL: http://www.commscope.com/andrew>.
"Talley: Microwave Ice Shields," 3 pages [retrieved on Jan. 27, 2016]. Retrieved from the Internet <URL: http://https://www.talleycom.com/viewCategory?id=HOME.COMPONENTS.SITERELATCOMP.MICICESHIELDS>.

\* cited by examiner

ICE SHIELD FOR TOWER-MOUNTED EQUIPMENT

FIELD OF THE TECHNOLOGY

The present technology relates generally to apparatuses and methods to protect tower-mounted equipment.

BACKGROUND

Wind Turbine Generators ("WTGs") and other types of tall towers and structures are often installed in cold climates and at remote locations that include rocky hilltops and ridges where space and electrical and communications infrastructure are extremely limited. Consequently, it can be advantageous to mount various sensors and electronics packages on the sides of these structures. Laufer Wind has developed an all-weather, radar-based Aircraft Detection System ("ADS") technology that continuously monitors the airspace around large standing structures, such as wind turbine generators, communication towers, and electrical power line towers, and turns on obstruction warning lights when aircraft are detected in the proximity of these structures. Laufer Wind ADS radars, such as those described in U.S. Pat. No. 7,876,260, can be physically small and lightweight enough to be mounted on the sides of WTGs or other towers and can use local tower power and communications, which helps alleviate mounting-space and infrastructure issues. Large amounts of ice can form on surfaces of WTGs and other towers. Ice sheets that weigh more than 1000 lbs can break off of the surfaces of WTGs and fall more than 450 feet to the ground. These large falling ice sheets in turn can shear off and destroy equipment mounted to the sides of towers.

SUMMARY

Accordingly, there is a need for apparatuses and methods to protect tower-mounted equipment from the impulsive forces of large sheets of falling ice. In one aspect, there is an ice shield assembly. The ice shield assembly can include an ice shield. The ice shield can include a base. The ice shield can include a blade structure having a first and a second end. The first end of the blade structure can be attached to the base. The ice shield can include at least one support member on each side of the blade structure. Each support member can be attached on a first end to the blade structure and on a second end to the base. The ice shield can include a beam attached to at least one of the base, the blade structure, and the support members. The ice shield assembly can include a mounting bracket, which can be engaged with the beam and can permit vertical translation of the ice shield with respect to the mounting bracket. The ice shield assembly can include a shock absorber attached to the mounting bracket and the ice shield. The shock absorber can be configured to arrest relative motion between the ice shield and the mounting bracket by dissipating kinetic energy in the ice shield assembly.

In some embodiments, the blade structure can include a blade beam having a first width and a blade having a second width attached to the blade beam. The second width of the blade can be smaller than the first width of the blade beam. In some embodiments, the ice shield assembly can include a blade brace attached to the blade beam and the blade. In some embodiments, the ice shield assembly can include a mounting band attached to the mounting bracket. In some embodiments, the blade structure can be made of high strength aluminum. In some embodiments, the base can be made of a metal or a composite material. In some embodiments, the support members can be made of a metal or a composite material.

In another aspect, there is a method of protecting tower-mounted equipment. The method can include providing a mounting band surrounding a tower above a piece of tower-mounted equipment. The method can include attaching a mounting bracket to the mounting band. The method can include providing an ice shield. The ice shield can include a base. The ice shield can include a blade structure having a first and a second end. The first end of the blade structure can be attached to the base. The ice shield can include at least one support member on each side of the blade structure. Each support member can be attached on a first end to the blade structure and on a second end to the base. The ice shield can include a beam attached to at least one of the base, the blade structure, and the support members. The mounting bracket can be engaged with the beam and can permit vertical translation of the ice shield with respect to the mounting bracket. The method can include attaching a shock absorber to the mounting bracket and the ice shield. The shock absorber can be configured to arrest relative motion between the ice shield and the mounting bracket by dissipating kinetic energy in the ice shield assembly.

In some embodiments, the blade structure can include a blade beam having a first width and a blade having a second width attached to the blade beam. The second width of the blade can be smaller than the first width of the blade beam. In some embodiments, the ice shield assembly can include a blade brace attached to the blade beam and the blade. In some embodiments, the blade structure can be made of high strength aluminum. In some embodiments, the base can be made of a metal or a composite material. In some embodiments, the support members can be made of a metal or a composite material. In some embodiments, the piece of tower-mounted equipment can be a radar device. In some embodiments, the tower can be a wind turbine tower.

In another aspect, there is an ice shield assembly. The ice shield assembly can include an ice shield. The ice shield can include a frame, a rigid cover extending over the frame, and a beam affixed to the frame. The ice shield assembly can include a mounting bracket, which can be engaged with the beam and can permit vertical translation of the ice shield with respect to the mounting bracket. The ice shield assembly can include a shock absorber attached to the mounting bracket and the ice shield. The shock absorber can be configured to arrest relative motion between the ice shield and the mounting bracket by dissipating kinetic energy in the ice shield assembly.

In some embodiments, the cover can be made of a metal or a composite material. In some embodiments, a space between the cover and the mounting bracket can be substantially filled by a composite material, which can be PVC foam. In some embodiments, the ice shield assembly can include a mounting band attached to the mounting bracket.

Other aspects and advantages of the present technology will become apparent from the following detailed description, taken in conjunction with the accompanying drawings, illustrating the principles of the technology by way of example only.

BRIEF DESCRIPTION OF THE DRAWINGS

The foregoing and other objects, features, and advantages of the present technology, as well as the technology itself, will be more fully understood from the following description of various embodiments, when read together with the accompanying drawings, in which.

DETAILED DESCRIPTION

The ice shield technology described herein can protect tower-mounted equipment from falling ice, facilitating the use of such equipment in a variety of environments. For example, large pieces of ice weighing in excess of 1000 lbs can fall from towers at heights exceeding 450 feet in some applications. Pieces of ice of this size and falling from such heights can achieve falling velocities approaching 120 mph (miles per hour) and kinetic energies approaching 1 MJ (mega-Joules). Ice sheets having this level of large mechanical energy and velocity that impact a shield can impart extremely large impulsive forces on an ice shield assembly. This can be enough kinetic energy to physically damage an ice shield assembly rigidly attached to the wall of a tower. Beneficially, the present technology can resist and dissipate such energy to protect equipment mounted below it.

Figure 1:
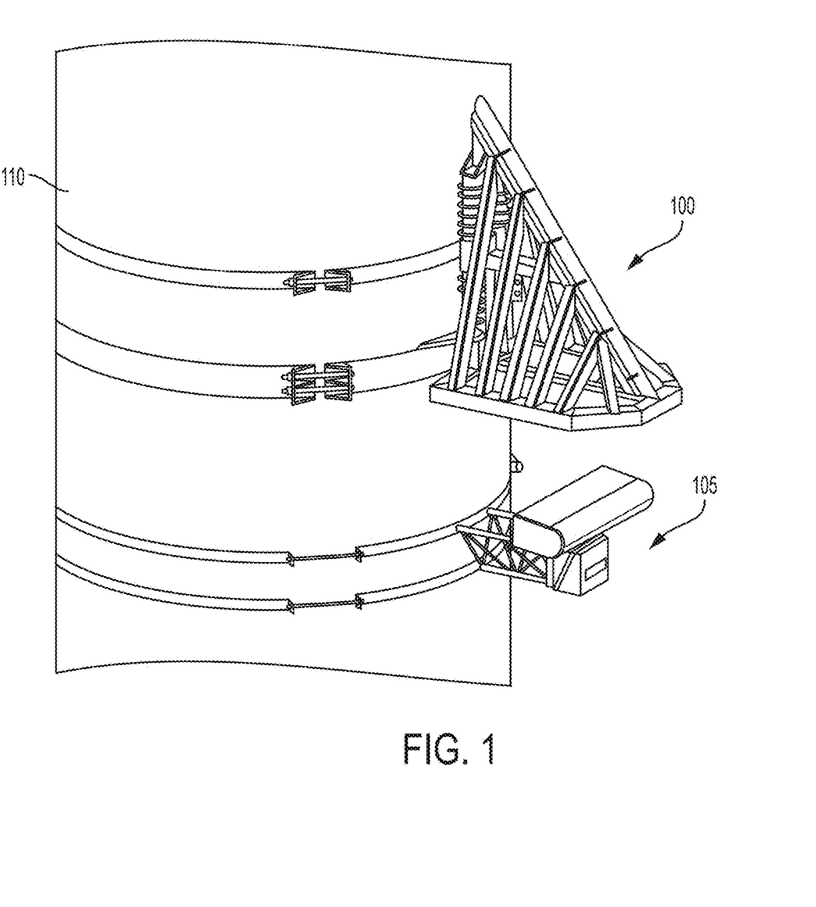
FIG. 1 depicts an ice shield assembly and radar equipment.
Figure 2:
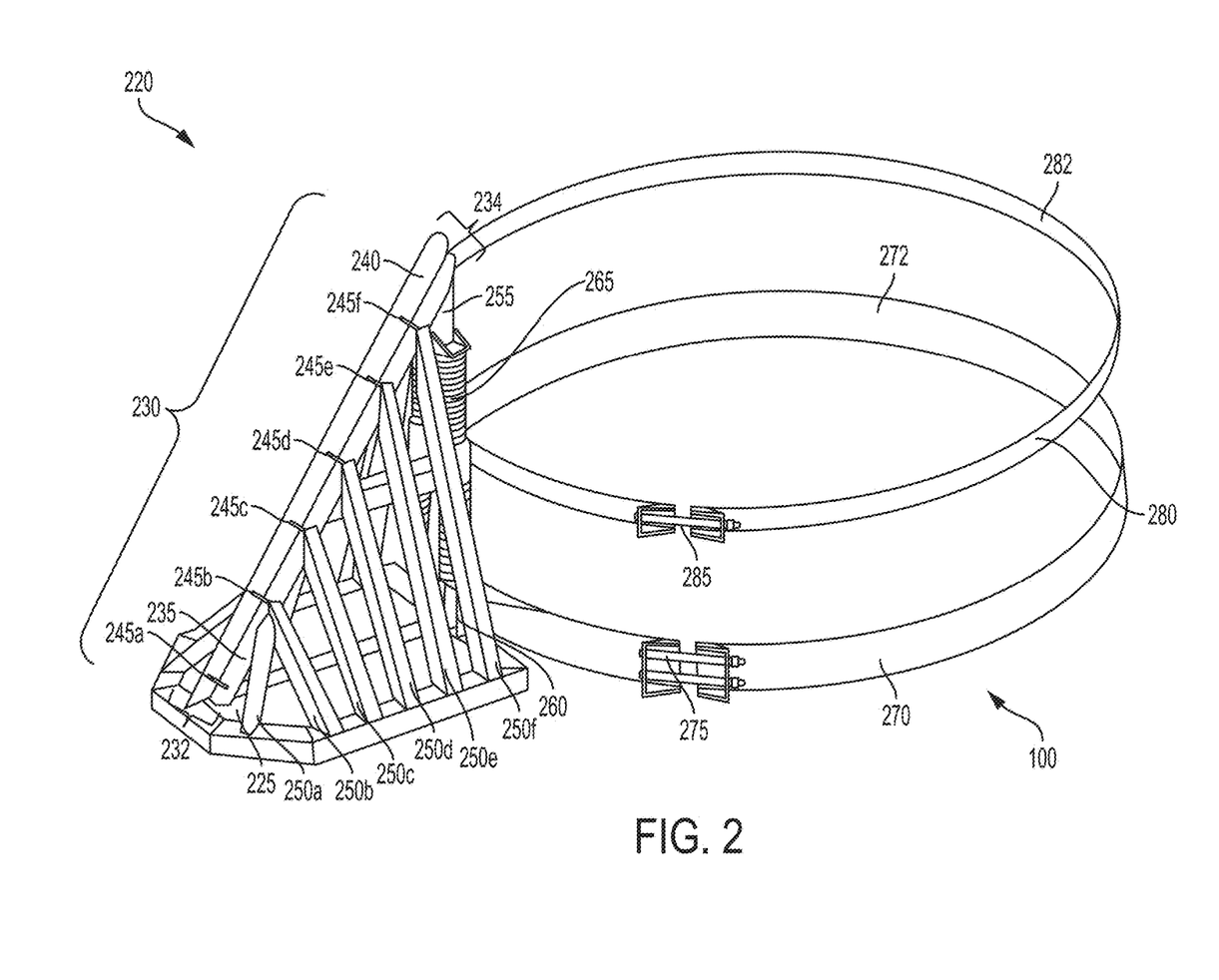
FIGS. 2-5 depict an ice shield assembly.
Figure 3:
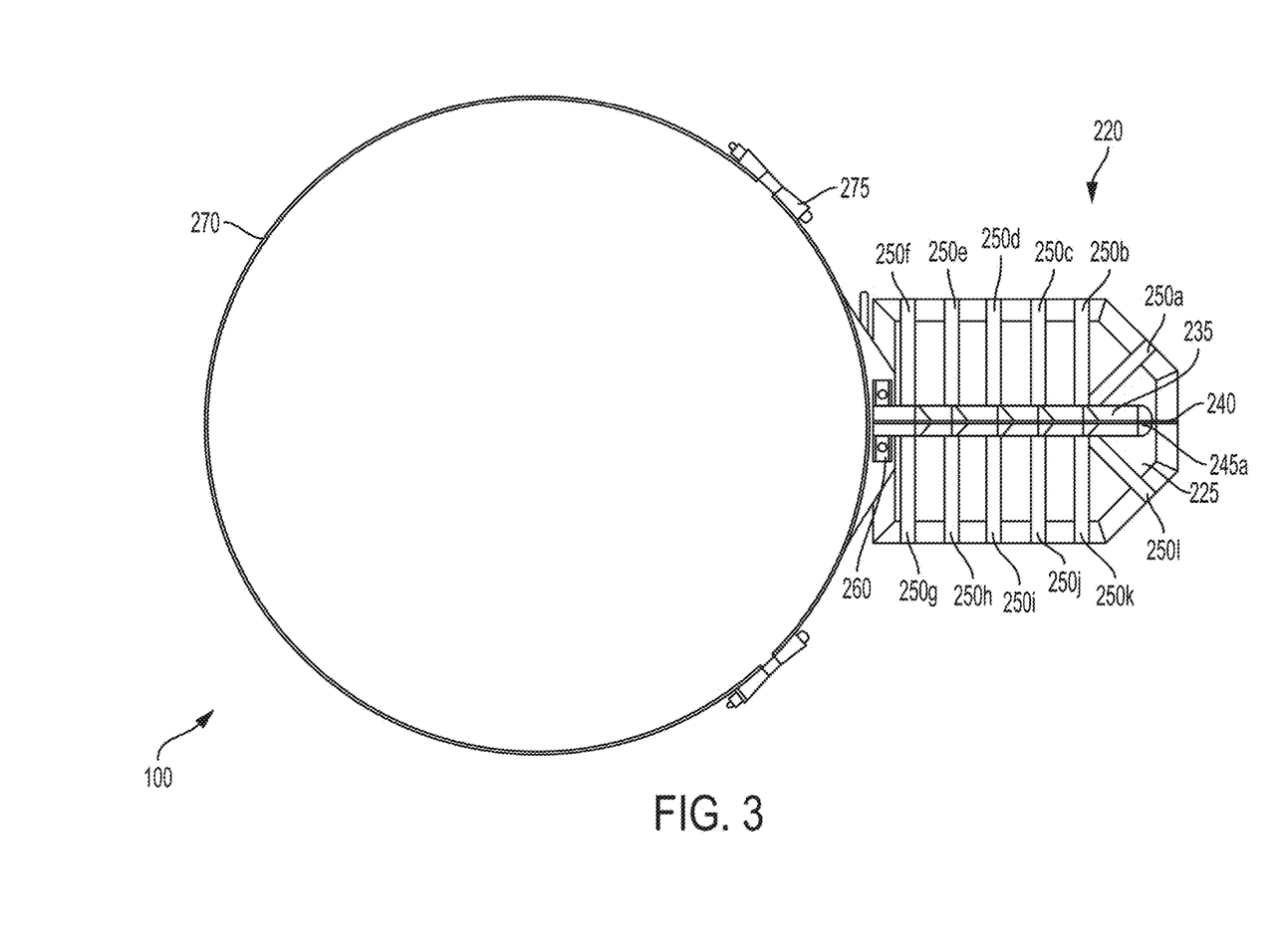
Figure 4:
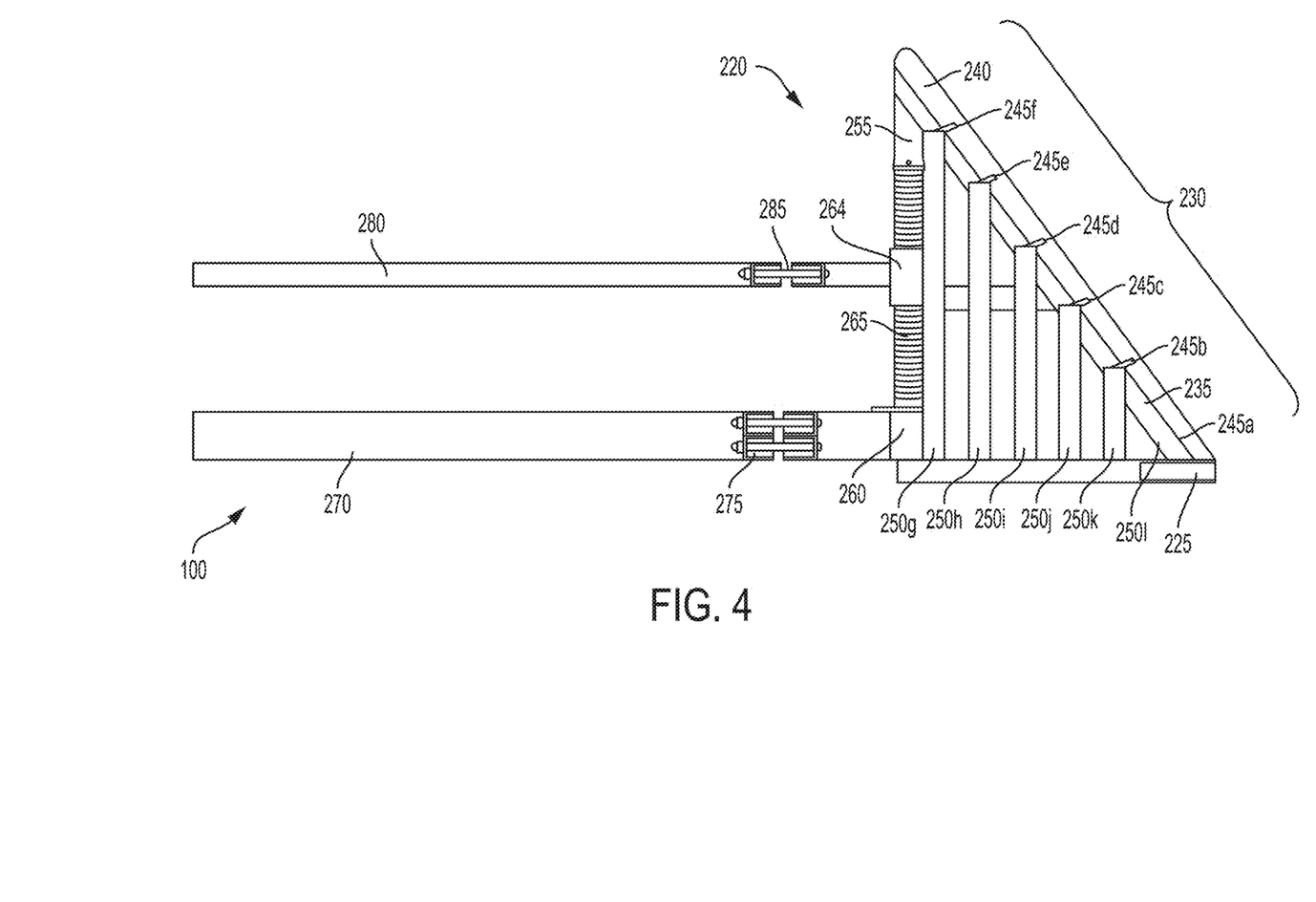
Figure 5:
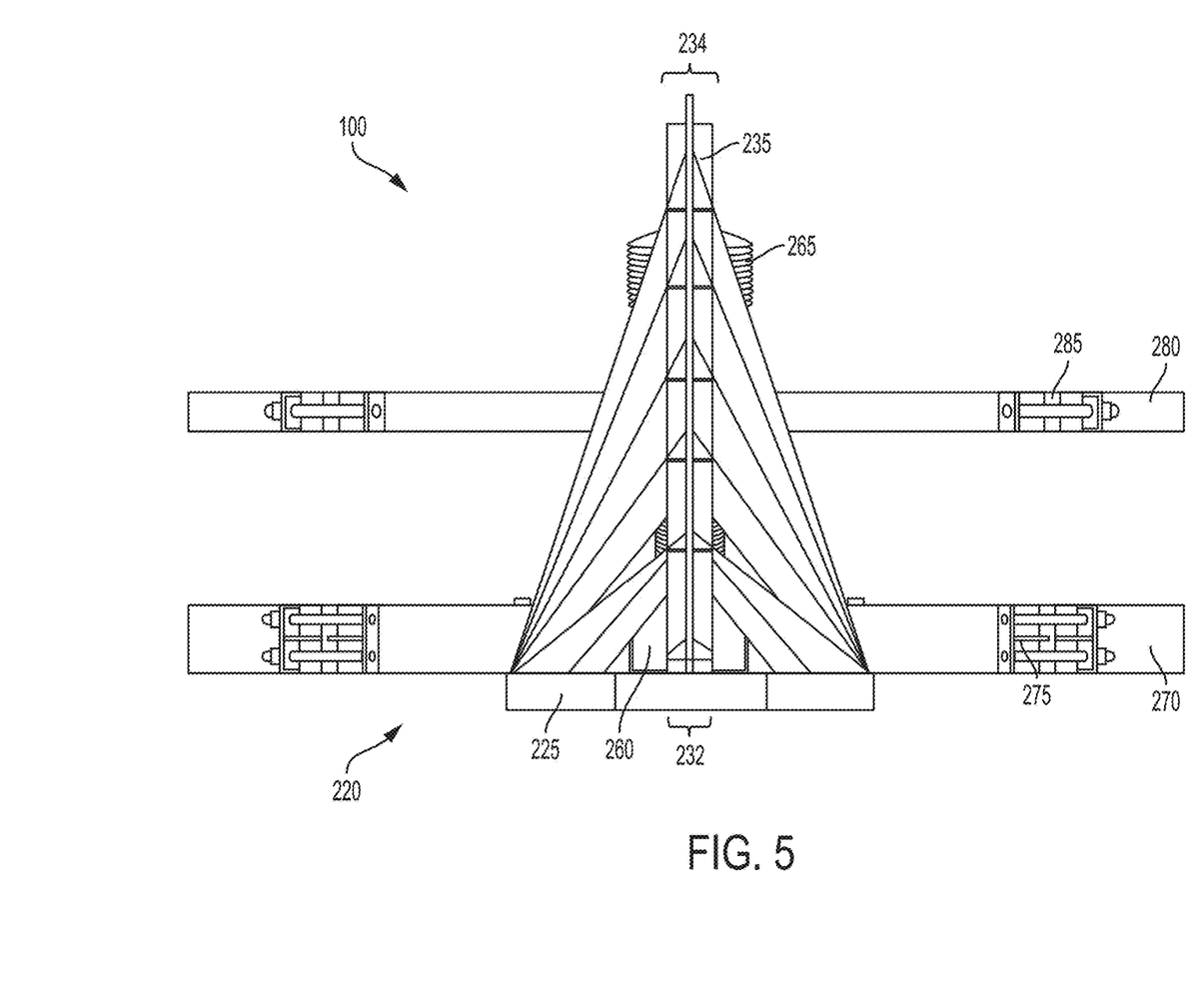

FIG. 1 depicts ice shield assembly 100 and radar equipment 105. Ice shield assembly 100 can be installed on WTG 110 above radar equipment 105 and physically protect radar equipment 105 from falling ice or other debris. FIGS. 2-5 depict ice shield assembly 100. As depicted in FIGS. 2-5, ice shield assembly 100 includes ice shield 220. Ice shield 220 includes base 225. Base 225 can be made of, for example, aluminum, steel, fiberglass or other composites, or other materials. Advantageous materials for base 225 include materials with high strength to weight ratio. Blade structure 230, having first end 232 and second end 234, is attached at first end 232 to base 225. Blade structure 230 is intended to break up any large pieces of ice that impact ice shield assembly 100. Support members 250a-250l are attached to blade structure 230 and to base 225 to rigidly position blade structure 230 and support members 250a-250l at angles to deflect falling ice away from ice shield assembly 100 and tower-mounted equipment below it. Blade structure 230 can be made of, for example, 7075 aircraft aluminum, other aluminum, or other materials. Beam 255 is attached to at least one of base 225, blade structure 230, and support members 250a-250l. In some embodiments, support members 250a-250l are made from mechanical box beams that can be arranged in an A-frame geometry. Support members 250a-250l can be made of, for example, lightweight, high strength composite materials such as fiberglass, or metals, such as 6061 aluminum or other aluminum or high strength steel. Mounting bracket 260 is engaged with ice shield 220 and permits vertical translation of ice shield 220 with respect to mounting bracket 260.

In some embodiments, blade structure 230 can include blade beam 235 attached to blade 240. As illustrated, blade beam 235 is wider than blade 240. Blade 240 can have a thin edge and can be made of strong and lightweight material such as 7075 aircraft aluminum. Blade 240 can break up ice and withstand impulsive shock created by impacting ice. In some embodiments, blade structure 230 includes multiple blade braces 245a-245f attached to blade beam 235 and blade 240.

Shock absorber 265 is attached to mounting bracket 260 and ice shield 220. Shock absorber 265 is configured to arrest relative motion between ice shield 220 and mounting bracket 260 by dissipating kinetic energy in ice shield assembly 100. In some embodiments, shock absorber 265 provides up to 20 inches of travel or stroke to limit impulsive force on ice shield assembly 100 and walls of WTG 110 to safe levels. Beneficially, this can permit the materials making up ice shield assembly 100 to operate below their elastic limits and thus avoid permanent mechanical deformation and damage to ice shield assembly 100. In some embodiments, shock absorber 265 can survive large impulsive forces and fast stroke accelerations, similar to, for example, designs used in aircraft applications. In some embodiments, shock absorber 265 can be a plurality of shock absorbers. In some embodiments, shock absorber 265 can dissipate mechanical energy under essentially adiabatic heating conditions to viscous fluids in shock absorber 265. Shock absorber 265 can include a gas or lubricant reservoir that can withstand large pressure surges and avoid damage to seals and stroke cylinders of shock absorber 265. In some embodiments, ice shield assembly 100 and shock absorber 265 can include stiff springs capable of dissipating impulsive mechanical energy or tuning transient movement of ice shield 220 so that it is critically damped. In some embodiments, ice shield 220 can be damped to avoid ice shield 220 from bottoming out at the base of mounting bracket 260 when impacted by falling ice or other debris and imparting unexpectedly high impulsive forces onto mounting bracket 260 and/or walls of WTG 110.

In some embodiments, ice shield assembly 100 includes mounting band 270. Mounting band 270 can include buckle 275. In some embodiments, mounting band 270 includes rubber sheet 272. Mounting band 270 can be made of, for example, cold-rolled high strength steel. Buckle 275 can include high strength bolts that can be tightened to impart clamping force on WTG 110 to avoid slippage of mounting band 270. In some embodiments, rubber sheet 272 is placed between mounting band 270 and WTG 110. Rubber sheet 272 can form a high coefficient of friction layer between mounting band 270 and WTG 110, to prevent mounting band 270 and ice shield assembly 100 from slipping in response to impulsive forces generated by impacting ice. In some embodiments, rubber sheet 272 acts as a protective layer and cushion between mounting band 270 and WTG 110 to avoid scraping and scratching, for example, a painted surface of WTG 110. In some embodiments, ice shield assembly 100 includes second mounting band 280. Second mounting band 280 can include buckle 285. In some embodiments, second mounting band 280 includes rubber sheet 282. Aspects of second mounting band 280 will become apparent with reference to the description of mounting band 270. In some embodiments, ice shield assembly includes mounting band 270 but does not include second mounting band 280. In some embodiments, ice shield assembly 100 can be fastened or attached directly to the tower structure (e.g., without using mounting band 270 or second mounting band 280).

Figure 6:
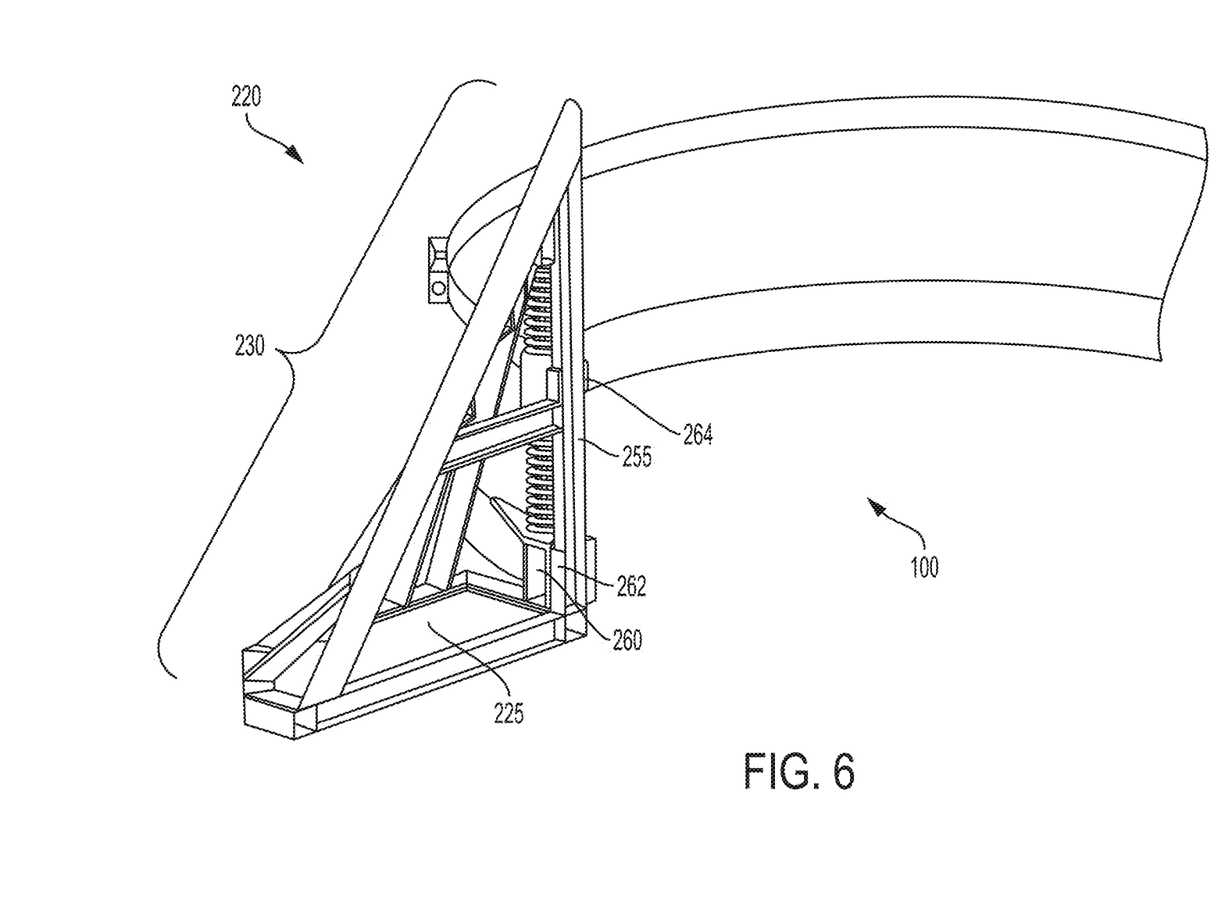
FIGS. 6-7 depict section views of an ice shield assembly.
Figure 7:
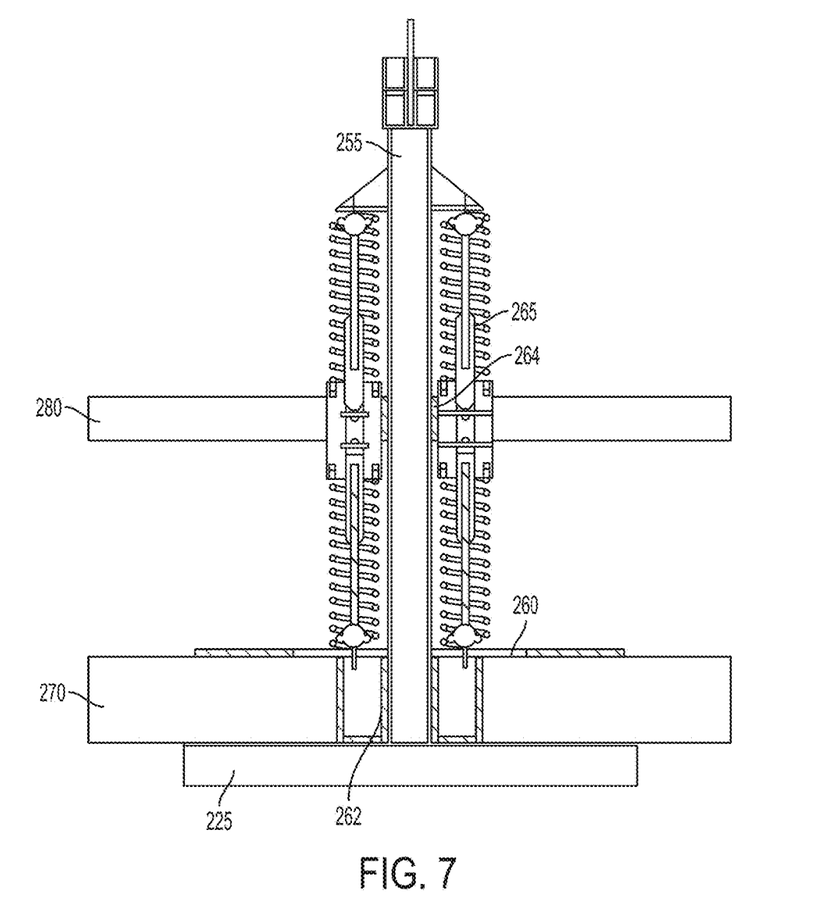

FIGS. 6-7 depict section views of ice shield assembly 100. As depicted in FIG. 6, mounting bracket 260 includes mounting bracket tubular section 262. Beam 255 of ice shield 220 is disposed within mounting bracket tubular section 262. When ice shield assembly 100 experiences impulsive forces from impacting ice, beam 255 can slide through tubular section 262. In some embodiments, second mounting band 280 includes second tubular section 264. Beam 255 can be disposed within tubular section 264 and beam 255 can slide through second tubular section 264. Mounting bracket tubular section 262 and second tubular section 264 serve as guides for the vertical motion of beam 255. In some embodiments, mounting bracket tubular section 262 and second tubular section 264 can be configured to ensure ice shield 220 is in position on WTG 110 to protect radar 105. Mounting bracket tubular section 262 and second tubular section 264 can restrain beam 255 to prevent horizontal translation or movement of ice shield 220 in response to impulsive forces from impacting ice or other debris.

FIG. 7 depicts a section view through the center of beam 255 and shock absorber 265. Beam 255 is engaged with mounting bracket tubular section 262 and second tubular section 264 such that beam 255 can slide through mounting bracket tubular section 262 and second tubular section 264. Shock absorber 265 is attached to beam 255 and mounting bracket 260 and arrests relative motion of ice shield 220 by dissipating impulsive mechanical energy that can be caused by falling ice imparting force to ice shield assembly 100. In some embodiments, when ice shield 220 is not experiencing impulsive force, base 225 can be in contact with mounting bracket 260.

Dimensions of ice shield 220 can be understood with reference to base 225 and beam 255. In some embodiments, base 225 can have a width of approximately 53 inches and a length, in a direction extending outwardly from WTG 110, of approximately 66.4 inches. The height of ice shield 220 can be defined by beam 255, which in some embodiments can have a height of 90 inches. The size and dimensions of ice shield 220 can be selected with reference to characteristics of the piece of tower-mounted equipment, for example radar 105, that is being protected, to protect such tower-mounted equipment. Ice shield 220 can be large enough to protect a piece of tower-mounted equipment from the impulsive forces of falling ice. Ice shield 220 can be made smaller to save on weight requirements. In some embodiments, mounting band 270 and second mounting band 280 can have a diameter of approximately 144 inches. In some embodiments, the diameter of mounting band 270 and second mounting band 280 is selected with reference to the diameter of the tower on which ice shield assembly 100 is mounted.

It should be appreciated that ice shield assembly 100 is merely an exemplary embodiment of the technology. The ice shield technology described herein can be mounted to other types of towers or protect other types of equipment mounted to towers.

Figure 8:
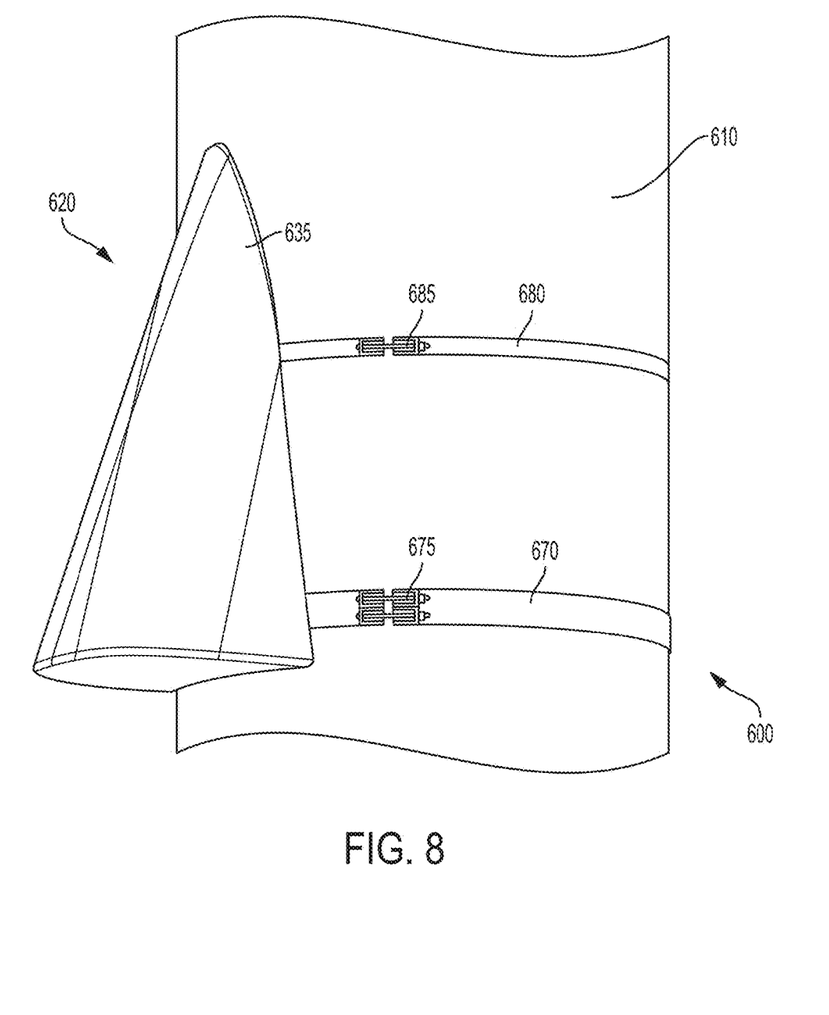
FIG. 8 depicts an ice shield assembly.
Figure 9:
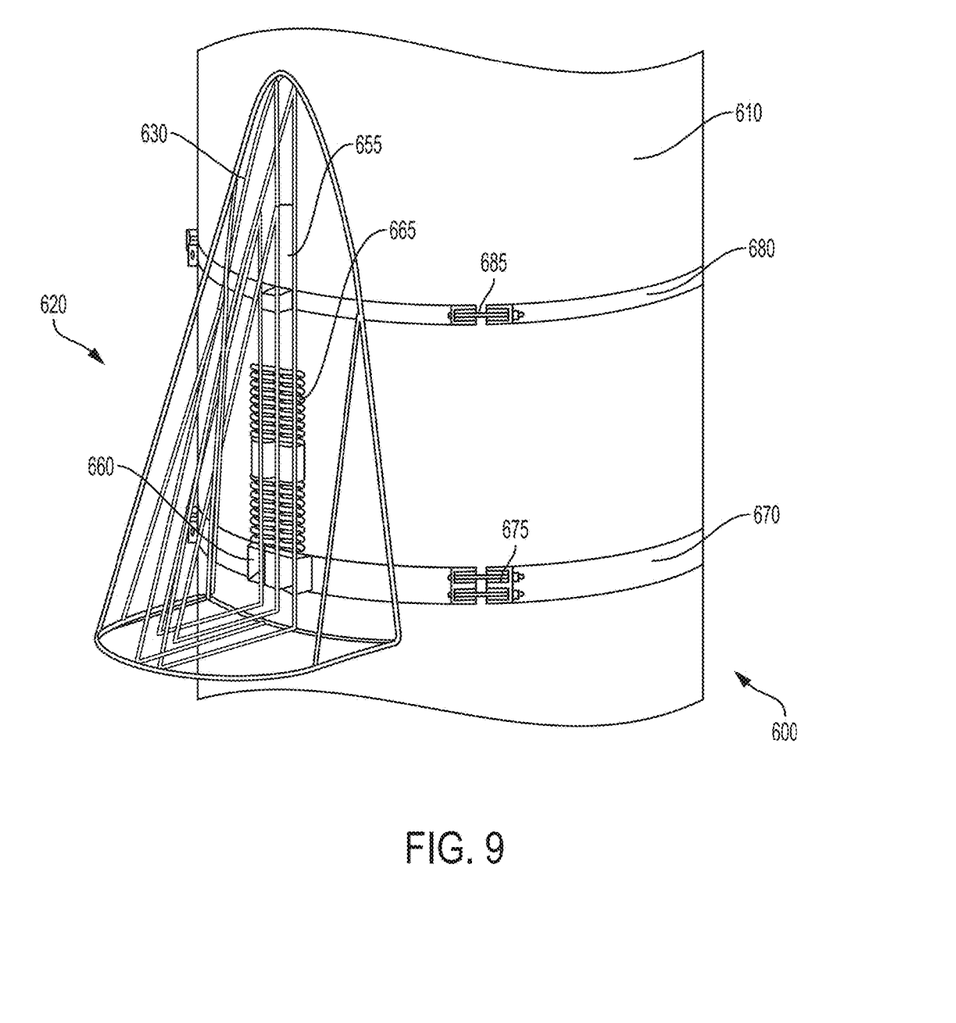
FIG. 9 depicts an ice shield assembly with rigid cover removed.

In accordance with the technology, the ice shield can take a variety of shapes. For example, FIG. 8 depicts ice shield assembly 600 with rigid cover 635. FIG. 9 depicts ice shield assembly 600 with rigid cover 635 removed. Ice shield assembly 600 generally can be installed above equipment mounted on or near WTG 610. Ice shield assembly 600 includes ice shield 620. Ice shield 620 includes frame 630. Rigid cover 635 extends over frame 630. Beam 655 is affixed to frame 630. Mounting bracket 660 is engaged with beam 655 and permits vertical translation of ice shield 620 with respect to mounting bracket 660. In some embodiments, beam 655 of ice shield 620 can slide through mounting bracket 660 in a manner similar to that described with respect to tubular section 262 and beam 255 of FIGS. 6-7. As illustrated, rigid cover 635 can extend over, for example, frame 630 and mounting bracket 660.

In some embodiments, frame 630 has a wire-frame structure. In some embodiments, the wire of the wire-frame structure can be 0.75 inches thick. Dimensions of ice shield 620 can be understood with reference to the height of frame 630 in the vertical direction. In some embodiments, ice shield 620 can have a height of approximately 12 feet. The size and dimensions of ice shield 620 can be selected with reference to characteristics of the piece of tower-mounted equipment, for example radar 105, that is being protected. In some embodiments, frame 630 can be made of aluminum, steel, or a composite material such as fiberglass. Shock absorber 665 is attached to mounting bracket 660 and ice shield 620. Shock absorber 665 is configured to arrest relative motion between ice shield 620 and mounting bracket 660 by dissipating kinetic energy in ice shield assembly 600.

In some embodiments, ice shield assembly 600 includes mounting band 670. Mounting band 670 can include buckle 675. Mounting band 670 can be made, for example, of cold-rolled high strength steel. Buckle 675 can include high strength bolts that can be tightened to impart clamping force on WTG 610 to avoid slippage of mounting band 670. In some embodiments, a rubber sheet is placed between mounting band 670 and WTG 610. In some embodiments, ice shield assembly 600 can include second mounting band 680, which can include second buckle 685. In some embodiments, ice shield assembly 600 can be mounted on other types of towers.

Figure 10:
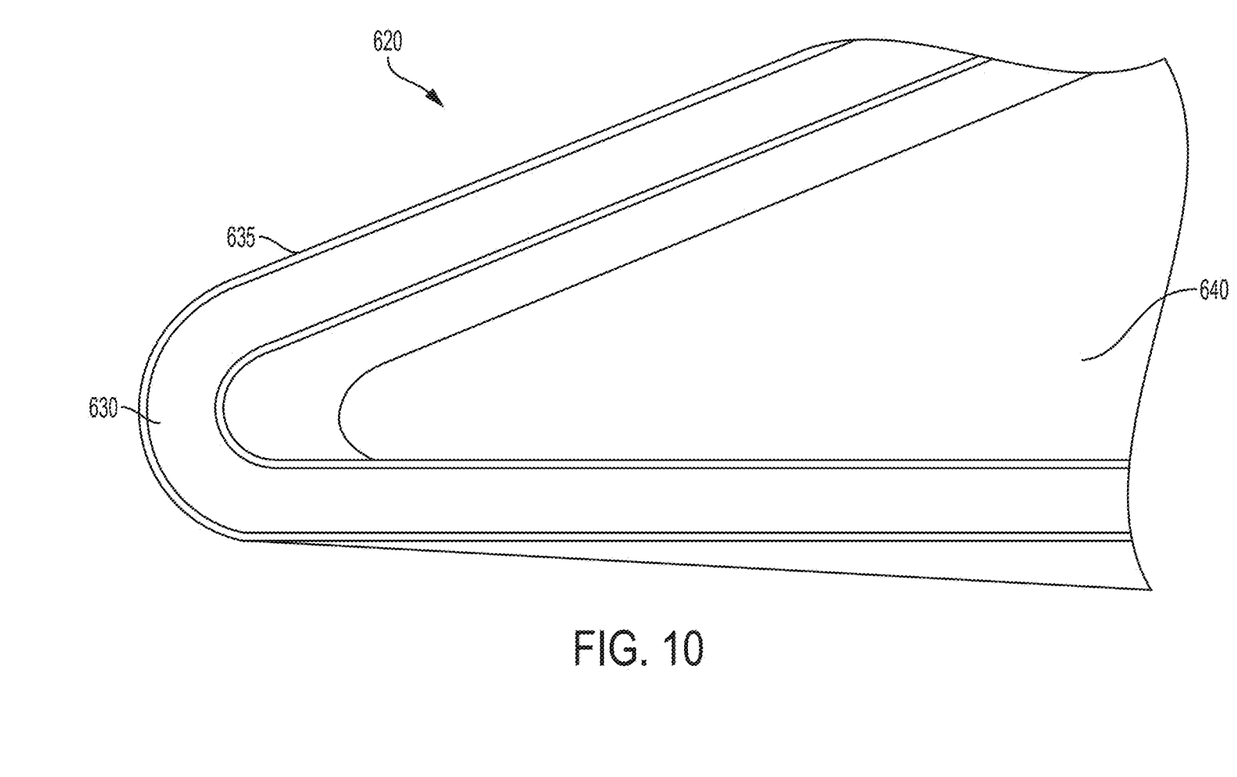
FIG. 10 depicts a cutaway view of an ice shield.

FIG. 10 depicts a cutaway view of ice shield 620. Rigid cover 635 extends over frame 630. In some embodiments, cover 635 can be made of, for example, fiberglass or other composites, metal, or other materials. In some embodiments, space between cover 635 and mounting bracket 660 can be substantially filled by composite material 640. In some embodiments, space between cover 635 and mounting bracket 660 can be completely or substantially filled by composite material 640 without adversely affecting the performance of ice shield assembly 600, for example by allowing beam 655 to slide freely. Composite material 640 can be, for example, PVC foam or other materials. In some embodiments, cover 635 can have a thickness of approximately 0.9 inches.

In some applications, the technology includes methods for protecting tower-mounted equipment. For example, mounting band 270 can be provided and can surround a tower above a piece of tower-mounted equipment. In some applications, mounting band 270 can be placed around WTG 110 above radar 105. Mounting bracket 260 can be attached to mounting band 270. Ice shield 220 can be provided. For example, as depicted in FIGS. 2-7, ice shield 220 includes base 225. Blade structure 230 is attached at a first end 232 to base 225. Multiple support members 250a-250l are provided on each side of blade structure 230, where each support member 250a-250l is attached to blade structure 230 and base 225. Beam 255 is attached to at least one of base 225, blade structure 230, and support members 250a-250l. Shock absorber 265 is attached to mounting bracket 260 and ice shield 220. Shock absorber 265 can be configured to arrest relative motion between ice shield 220 and mounting bracket 260 by dissipating kinetic energy in ice shield assembly 100.

Additional applications and embodiments will become clear with reference to descriptions and figures herein. For example, in some applications, the technology includes methods for protecting tower-mounted equipment with ice shield assembly 600, as shown in FIGS. 8-10. The above embodiments are intended for illustrative purposes only.

What is claimed is:
1. An ice shield assembly comprising:
   an ice shield comprising:
      a base;

a blade structure having a first and a second end, wherein the first end is attached to the base;

at least one support member on each side of the blade structure, wherein each support member is attached on a first end to the blade structure and on a second end to the base;

a beam attached to at least one of the base, the blade structure, and the support members;

a mounting bracket, wherein the mounting bracket is engaged with the beam and permits vertical translation of the ice shield with respect to the mounting bracket;

a shock absorber attached to the mounting bracket and the ice shield, wherein the shock absorber is configured to arrest relative motion between the ice shield and the mounting bracket by dissipating kinetic energy in the ice shield assembly.

2. The ice shield of claim 1, wherein the blade structure comprises a blade beam having a first width and a blade having a second width attached to the blade beam, wherein the second width is smaller than the first width.

3. The ice shield of claim 2, further comprising a blade brace attached to the blade beam and the blade.

4. The ice shield of claim 1, further comprising a mounting band attached to the mounting bracket.

5. The ice shield of claim 1, wherein the blade structure is made of high strength aluminum.

6. The ice shield of claim 1, wherein the base is made of a metal or a composite material.

7. The ice shield of claim 1, wherein the support members are made of a metal or a composite material.

8. A method of protecting tower-mounted equipment comprising:

providing a mounting band surrounding a tower above a piece of tower-mounted equipment;

attaching a mounting bracket to the mounting band;

providing an ice shield, the ice shield comprising:

a base;

a blade structure having a first and a second end, wherein the first end is attached to the base;

at least one support member on each side of the blade structure, wherein each support member is attached on a first end to the blade structure and on a second end to the base;

a beam attached to at least one of the base, the blade structure, and the support members, wherein the mounting bracket is engaged with the beam and permits vertical translation of the ice shield with respect to the mounting bracket;

attaching a shock absorber to the mounting bracket and the ice shield, wherein the shock absorber is configured to arrest relative motion between the ice shield and the mounting bracket by dissipating kinetic energy in the ice shield assembly.

9. The method of claim 8, wherein the blade structure comprises a blade beam having a first width and a blade having a second width attached to the blade beam, wherein the second width is smaller than the first width.

10. The method of claim 9, further comprising a blade brace attached to the blade beam and the blade.

11. The method of claim 8, wherein the blade structure is made of high strength aluminum.

12. The method of claim 8, wherein the base is made of a metal or a composite material.

13. The method of claim 8, wherein the support members are made of a metal or a composite material.

14. The method of claim 8, wherein the piece of tower-mounted equipment is a radar device.

15. The method of claim 8, wherein the tower is a wind turbine tower.

16. An ice shield assembly comprising:

an ice shield comprising:

a frame;

a rigid cover extending over the frame; and a beam affixed to the frame;

a mounting bracket, wherein the mounting bracket is engaged with the beam and permits vertical translation of the ice shield with respect to the mounting bracket;

a shock absorber attached to the mounting bracket and the ice shield, wherein the shock absorber is configured to arrest relative motion between the ice shield and the mounting bracket by dissipating kinetic energy in the ice shield assembly.

17. The ice shield of claim 16, wherein the cover is made of a metal or a composite material.

18. The ice shield of claim 16, wherein a space between the cover and the mounting bracket is substantially filled by a composite material.

19. The ice shield of claim 18, wherein the composite material is PVC foam.

20. The ice shield of claim 16, further comprising a mounting band attached to the mounting bracket.

* * * * *